United States Patent [19]

Matsuda et al.

[11] Patent Number: 5,106,172
[45] Date of Patent: Apr. 21, 1992

[54] METHOD FOR CONTROLLING HYDRAULIC BRAKING PRESSURE FOR A VEHICLE

[75] Inventors: Shohei Matsuda; Tadatoshi Haga, both of Wako, Japan

[73] Assignee: Honda Giken Kogyo Kabushiki Kaisha, Tokyo, Japan

[21] Appl. No.: 668,692

[22] Filed: Mar. 7, 1991

Related U.S. Application Data

[63] Continuation of Ser. No. 356,729, May 25, 1989, abandoned.

[30] Foreign Application Priority Data

Jun. 10, 1988 [JP] Japan ............................ 63-143863

[51] Int. Cl.$^5$ ............................................. B60T 8/32
[52] U.S. Cl. ........................................ 303/103; 303/105; 303/106; 364/426.02; 188/181 A
[58] Field of Search ............... 303/100, 91, 94–99, 303/102–111, 113–119, 113 R; 188/181 A, 181 R, 181 C; 364/426.01, 426.02, 426.03

[56] References Cited

U.S. PATENT DOCUMENTS

| | | | |
|---|---|---|---|
| 3,563,611 | 2/1971 | Sharp | 303/95 |
| 3,771,840 | 11/1973 | Hubbard | 303/96 |
| 3,966,267 | 6/1976 | McNilch, Jr. et al. | 303/106 |
| 4,003,607 | 1/1977 | Haney et al. | |
| 4,035,033 | 7/1977 | Okada et al. | |
| 4,076,332 | 2/1978 | Taylor et al. | 303/97 |
| 4,077,675 | 3/1978 | Leiber et al. | 303/95 |
| 4,090,741 | 5/1978 | Rajput | 303/105 X |
| 4,130,323 | 12/1978 | Rajput et al. | 303/97 X |
| 4,183,588 | 1/1980 | Snyder | 303/110 |
| 4,446,522 | 5/1984 | Sato et al. | 303/105 X |
| 4,585,280 | 4/1986 | Leiber | 303/110 X |
| 4,717,209 | 1/1988 | Hagiya et al. | 303/103 X |
| 4,733,014 | 9/1988 | Hagiya et al. | 303/95 X |
| 4,741,580 | 5/1988 | Matsubara et al. | 303/105 |
| 4,762,375 | 8/1988 | Maki et al. | 303/103 X |
| 4,765,692 | 8/1988 | Miyake | 303/110 X |
| 4,773,714 | 9/1988 | Shimanuki et al. | 303/108 |

FOREIGN PATENT DOCUMENTS

| | | |
|---|---|---|
| 3102108A1 | 1/1982 | Fed. Rep. of Germany . |
| 3102227A1 | 1/1982 | Fed. Rep. of Germany . |
| 3709157 | 10/1987 | Fed. Rep. of Germany ...... 303/110 |

*Primary Examiner*—Douglas C. Butler
*Attorney, Agent, or Firm*—Armstrong & Kubovick

[57] ABSTRACT

According to the method of the present invention, when the vehicle speed has become less than the reference speed, after a reduction in the hydraulic braking pressure during braking, the hydraulic braking pressure is gradually increased. According to the above method, the rate of increase of the hydraulic braking pressure is moderated when the vehicle speed has become less than a reference value. This will avoid the degradation in braking feeling due to a rapid increase in hydraulic braking pressure for a wheel brake.

20 Claims, 3 Drawing Sheets

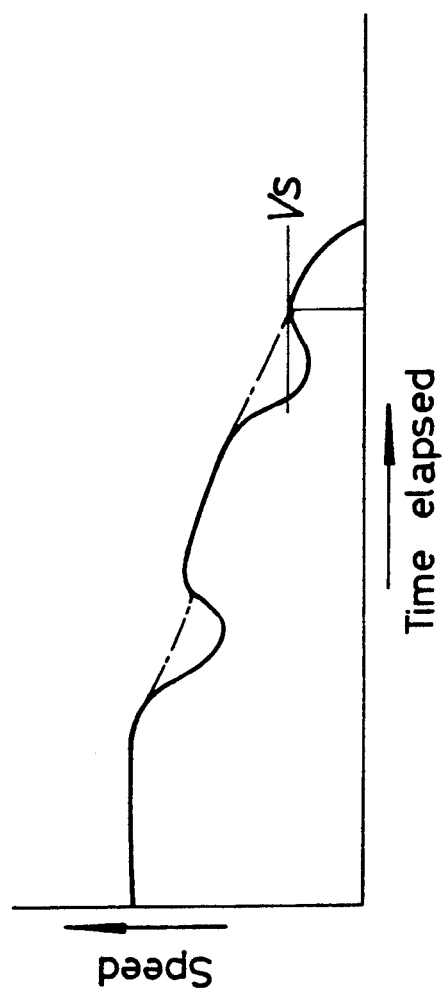

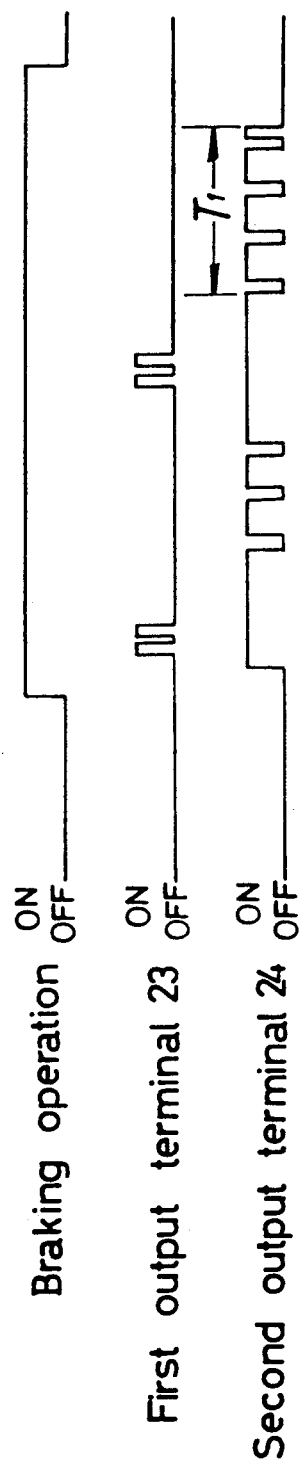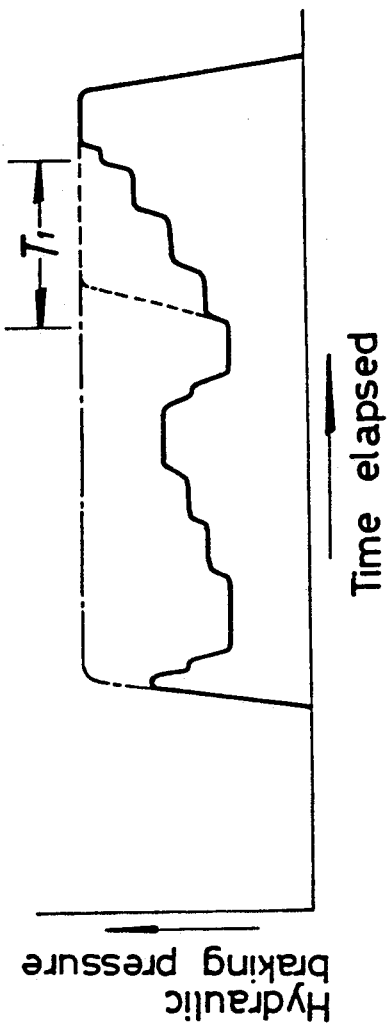

METHOD FOR CONTROLLING HYDRAULIC BRAKING PRESSURE FOR A VEHICLE

This application is a continuation of application Ser. No. 356,729, filed May 25, 1989, now abandoned.

FIELD OF THE INVENTION

The present invention relates to a method for controlling the hydraulic braking pressure for a vehicle when a wheel is about to become locked during braking. With the method of the present invention, the hydraulic braking pressure, for a brake mounted on the wheel, is reduced except when the vehicle speed is less than a reference speed.

BACKGROUND OF THE INVENTION

In a conventional anti-lock control device designed to control the hydraulic braking pressure based on the vehicle speed, the anti-lock control, in some cases, cannot be properly performed at a vehicle speed less than a given vehicle speed due to a reduction in the detecting capability of a wheel speed sensor, a decrease in rotational inertia of the wheel or the like. For this reason, the anti-lock control is stopped, i.e., the hydraulic braking pressure is not reduced in this condition.

In the above prior art device, however, during excessive braking where an anti-lock operation is produced by an excessive depressing force on a brake pedal, extra hydraulic braking pressure produced by the excessive depressing force is restrained from being supplied to the brake when the vehicle speed exceeds a given value. However, in order to stop the anti-lock operation when the vehicle speed has become less than the given value, the extra hydraulic braking pressure which has been restrained up to now is rapidly supplied to the brake. This may bring about a degradation in braking feeling.

SUMMARY OF THE INVENTION

The present invention has been accomplished with the problem of the prior art in view, and it is an object of the present invention to provide a method for controlling the hydraulic braking pressure for a vehicle, wherein when the vehicle speed has become less than a given value, the hydraulic braking pressure is increased, and the rate of such an increase is moderated, thereby avoiding degradation in braking feeling.

According to the present invention, when the vehicle speed has become less than the reference speed after a reduction in the hydraulic braking pressure during braking, the hydraulic braking pressure is gradually increased.

According to the above method, the rate of increase of the hydraulic braking pressure is moderated when the vehicle speed has become less than a reference value. This will avoid the degradation in braking feeling due to a rapid increase in hydraulic braking pressure for a wheel brake.

BRIEF DESCRIPTION OF THE DRAWINGS

The drawings illustrate one embodiment of the present invention wherein:

FIG. 2 is a graph illustrating variations in wheel speed and vehicle speed over a period of time;
FIG. 3 is a timing chart;
and
FIG. 4 is a graph illustrating variations in hydraulic braking pressure over a period of time.

DESCRIPTION OF THE PREFERRED EMBODIMENTS

Figure 1:
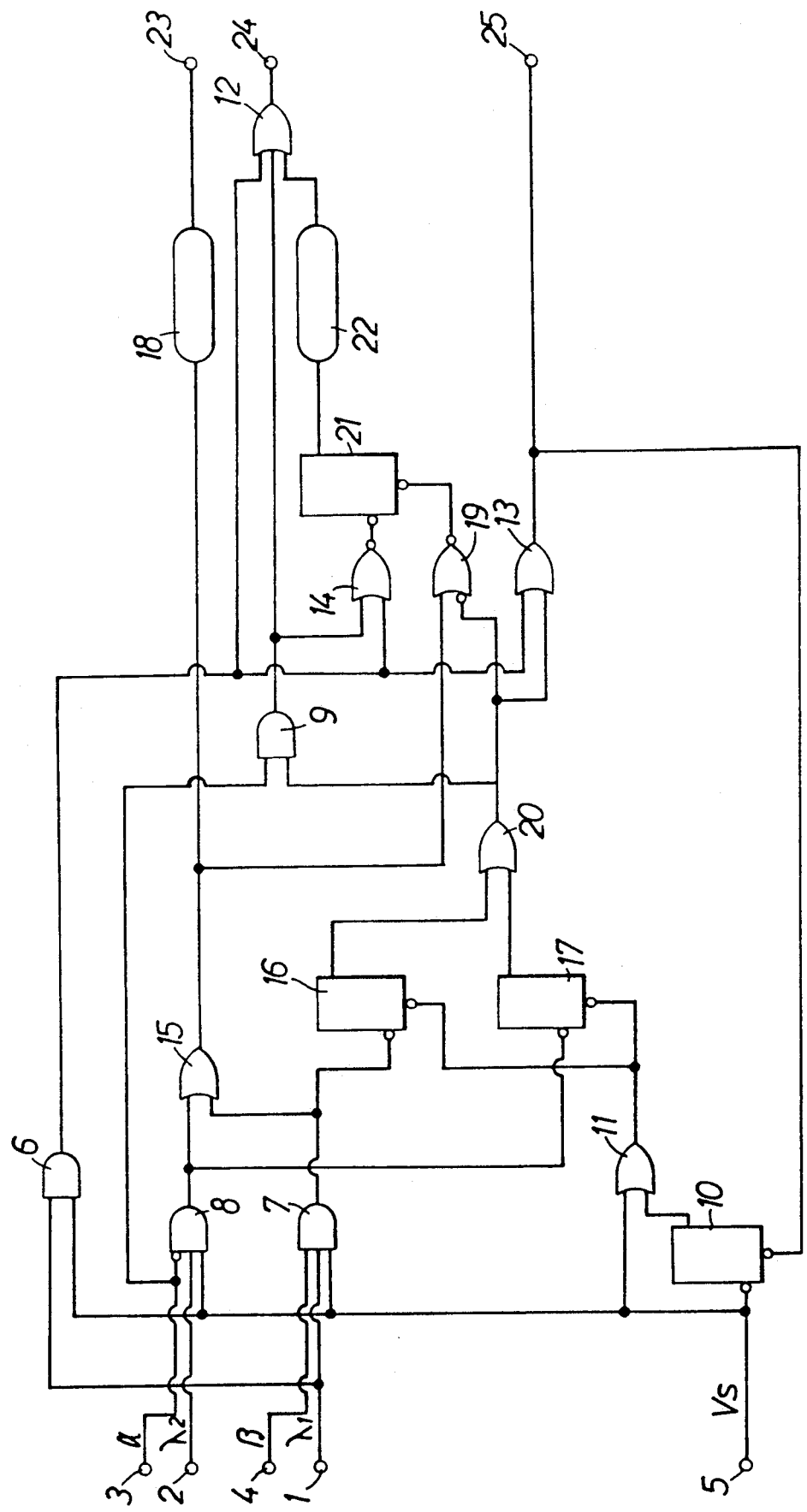
FIG. 1 is a diagram of a control circuit.

The present invention will now be described by way of one embodiment with reference to the accompanying drawings. Referring first to FIG. 1, signals required for controlling a wheel brake are supplied to first to fifth input terminals 1 to 5, respectively. More specifically, a signal $\lambda_1$ which becomes a high level when the slippage of the wheel has exceeded a first reference value, is supplied to the first input terminal 1 based upon the wheel speed. A signal $\lambda_2$ is supplied to the second input terminal 2 on the basis of the wheel speed. The signal $\lambda_2$ becomes a high level when the slippage of the wheel has exceeded a second reference value set larger than the first reference value. A signal $\alpha$ is supplied to the third input terminal 3. The signal $\alpha$ becomes a high level when the wheel acceleration has exceeded a certain value. A signal $\beta$ is supplied to the fourth input terminal 4 and becomes a high level when the wheel deceleration has exceeded a certain value. A signal Vs is supplied to the fifth input terminal 5 and becomes a high level when the vehicle speed has exceeded a reference speed, e.g., 10 km/hr.

The first input terminal 1 is connected to respective input terminals of AND circuits 6 and 7. The second input terminal 2 is connected to an input terminal of an AND circuit 8. The third input terminal 3 is connected, in an inverted manner, to an input terminal of the AND circuit 8 and is also connected to an input terminal of an AND circuit 9. The fourth input terminal 4 is connected to an input terminal of the AND circuit 7. The fifth input terminal 5 is connected to respective input terminals of the AND circuits 6, 7 and 8. Moreover, the fifth input terminal 5 is connected, in an inverted manner, to an input terminal of a timer circuit 10 and is also connected to one of the input terminals of an OR circuit 11. An output terminal of the timer circuit 10 is connected to the other input terminals of the OR circuit 11.

Thus, the AND circuit 6 produces a high level signal when the vehicle speed is determined to exceed the reference speed and there is a possibility of the wheel becoming locked. The AND circuit 7 produces a high level signal when it has been determined that there is a possibility of the wheel becoming locked in a speed-reducing condition where the vehicle speed exceeds the reference speed. The AND circuit 8 produces a high level signal when it has been determined that the vehicle speed exceeds the reference speed and there is an increased possibility of the wheel becoming locked in a condition where the wheel speed is not increasing. The OR circuit 11 produces a high level signal either when the vehicle speed exceeds the reference speed or when the output from the timer circuit 10 is at a high level. The timer circuit 10 produces a high level signal sustained by a given time $T_1$ from a point when the output from the fifth input terminal 5 has become a low level, i.e., when the vehicle speed has become less than the reference speed.

An output terminal of the AND circuit 6 is connected to input terminals of OR circuits 12 and 13 and a NOR circuit 14. An output terminal of the AND circuit 7 is connected to an input terminal of an OR circuit 15 and connected, in an inverted manner, to an input terminal of a timer circuit 16. An output terminal of the AND circuit 8 is connected to the other input terminal of the OR circuit 15 and is also connected, in an inverted manner, to an input terminal of a timer circuit 17. An output terminal of the OR circuit 11 is invertedly connected to reset input terminals of the timer circuits 16 and 17.

Thus, the OR circuit 15 produces a high level signal indicative of a command to reduce the hydraulic braking pressure when at least either one of the AND circuits 7 and 8 produces a high level signal. An output of the OR circuit 15 is connected to a first output terminal 23 through an oscillator circuit 18. The first output terminal 23 is used to control an inlet valve in an anti-lock controller, so that the inlet valve may be opened to reduce the hydraulic braking pressure when the output signal from the first output terminal 23 is at a high level.

The timer circuit 16 produces a high level signal sustained by a given timer $T_2$ from a point when the output from the AND circuit 7 has become a low level. The timer circuit 16 is reset when the output from the OR circuit 11 is at a low level, i.e., the vehicle speed is less than the standard speed and moreover, the given time $T_1$ set in the timer 10 has elapsed. The timer circuit 17 produces a high level signal sustained by a given time $T_3$ from a point when the output from the AND circuit 8 has become a low level, and it is reset as the output from the OR circuit 11 becomes a low level.

An output terminal of the OR circuit 15 is connected to an input terminal of an NOR circuit 19 in addition to the oscillator circuit 18. Output terminals of the timer circuit 16 and 17 are connected to input terminals of an OR circuit 20. An output terminal of the OR circuit 20 is connected to an input terminal of an AND circuit 9 and an input terminal of the OR circuit 13 and is also connected, in an inverted manner, to an input terminal of the NOR circuit 19.

The AND circuit 9 produces a high level signal when the wheel speed is increasing and at least one of the timer circuits 16 and 17 produces a high level signal. An output terminal of the AND circuit 9 is connected to an input terminal of the OR circuit 12. The NOR circuit 14 produces a high level signal when each of the outputs from the AND circuits 6 and 9 are at a low level. An output terminal of the NOR circuit 14 is invertedly connected to an input terminal of the timer circuit 21. The NOR circuit 19 produces a high level signal when the output from the OR circuit 15 is at a low level and the output from the OR circuit 20 is at a high level. An output terminal from the NOR circuit 19 is invertedly connected to a reset input terminal of the timer circuit 21.

The timer circuit 21 produces a high level signal sustained by a given time $T_4$ from a point when the output from the NOR circuit 14 has become a low level. An output terminal of the timer circuit 21 is connected to the remaining input terminal of the OR circuit 12 through an oscillator circuit 22. An output terminal of the OR circuit 12 is connected to a second output terminal 24 which is used to control an outlet valve in the anti-lock controller, so that the outlet valve may be opened to increase the hydraulic braking pressure when the output signal from the second terminal 24 is at a high level.

An output terminal of the OR circuit 13 is invertedly connected to a reset input terminal of the timer circuit 10 and is connected to a third output terminal 25. Thus, the timer circuit 10 is reset when the output from the OR circuit 13 is at a low level. The third output terminal 25 is used to provide an anti-lock control. As the output from the third output terminal 25 becomes a high level, the anti-lock control is performed.

The operation of this embodiment will be described below with reference to FIGS. 2, 3 and 4. FIG. 2 illustrates variations in wheel speed (indicated by a solid line) and vehicle speed (indicated by a broken line) over a period of time. FIG. 3 illustrates a braking operation and a timing chart for the first and second output terminals 23 and 24. FIG. 4 illustrates variations in hydraulic braking pressure over a period of time. The periods of time in FIGS. 2, 3 and 4 correspond to one another.

When the vehicle speed has become less than the reference speed (Vs) during braking, the resetting of the timer circuits 16 and 17 is delayed by the given time $T_1$ since the timer circuit 10 produces a high level signal sustained by the given time $T_1$. When the given time $T_1$ has elapsed, the output signal from the second output terminal 24 is chopped by the oscillator circuit 22 so that the hydraulic braking pressure is intermittently maintained. This permits the hydraulic braking pressure to be increased stepwise, wherein the increase in hydraulic braking pressure is moderate when compared with that in the prior art shown by a broken line in FIG. 4. Accordingly, the extra hydraulic braking pressure, which has been restrained up to now, cannot be rapidly supplied to the brake. Thus, the degradation of braking feeling can be avoided.

As discussed above, according to the present invention, when the vehicle speed has become less than the reference speed after reduction of the hydraulic braking pressure during braking, the hydraulic braking pressure is gradually increased. Therefore, it is possible to avoid the degradation of braking feeling brought about by the rapid supplying of a hydraulic braking pressure to the wheel brake when the vehicle speed has become less than the reference speed.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A method for gradually restoring the hydraulic braking pressure for a vehicle after terminating an anti-lock control, comprising the steps of:
   reducing the hydraulic braking pressure, for a brake mounted on a wheel, when the wheel is about to become locked during braking, except when the vehicle speed is less than a reference speed; and
   step-wise moderating a rate of increase of hydraulic braking pressure, which was restrained during anti-lock control, when the vehicle speed has become less than the reference speed wherein degradation of braking feeling due to a rapid increase in hydraulic pressure is prevented.

2. A method for gradually restoring the hydraulic braking pressure for a vehicle after terminating anti-lock control according to claim 1, further comprising the step of intermittently maintaining the hydraulic braking pressure for a given period of time from a point when the vehicle speed becomes less than the reference speed.

3. A method for gradually restoring the hydraulic braking pressure for a vehicle after effecting an anti-lock control operation, said method comprising the steps of:

inhibiting said anti-lock control operation when a vehicle speed is less than a reference speed irrespective of a locking tendency on a vehicle wheel; and step-wise moderating a rate of increase of hydraulic braking pressure, which was restrained during said anti-lock control operation, after inhibiting said anti-lock control operation wherein degradation of braking feeling due to a rapid increase in hydraulic pressure is prevented.

4. A method according to claim 3, further comprising the step of intermittently maintaining the hydraulic braking pressure for a given period of time from a point when the vehicle speed become less than the reference speed.

5. The method for gradually restoring the hydraulic braking pressure for a vehicle after effecting an anti-lock control operation, said method comprising the steps of:

inhibiting said anti-lock control operation when a vehicle speed is less than a reference speed irrespective of a locking tendency on a vehicle wheel; and moderating a rate of increase of hydraulic braking pressure, which was restrained during said anti-lock control operation, after inhibiting said anti-lock control operation wherein degradation of braking feeling due to a rapid increase in hydraulic pressure is prevented, wherein the anti-lock control operation is conducted by intermittently increasing the hydraulic braking pressure for a first predetermined period of time from a point when the slip rate of the wheel falls below a predetermined threshold value and said anti-lock control operation is inhibited by forcibly negating a signal indicative of a condition that the wheel slip rate exceeds the predetermined threshold value, and wherein inhibiting of the anti-lock control operation is delayed for a second predetermined period of time.

6. The method for gradually restoring the hydraulic braking pressure for a vehicle after effecting an anti-lock control operation, said method comprising the steps of:

inhibiting said anti-lock control operation when a vehicle speed is less than a reference speed irrespective of a locking tendency on a vehicle wheel; and moderating a rate of increase of hydraulic braking pressure, which was restrained during said anti-lock control operation, after inhibiting said anti-lock control operation wherein degradation of braking feeling due to a rapid increase in hydraulic pressure is prevented, wherein the anti-lock control operation is conducted by intermittently increasing the hydraulic braking pressure for a first predetermined period of time from a point when the acceleration of the wheel exceeds a predetermined threshold value and said anti-lock control operation is inhibited by forcibly negating a signal indicative of a condition that the wheel acceleration is reduced below the predetermined threshold value, and wherein inhibiting of the anti-lock control operation is delayed for a second predetermined period of time.

7. An electrical circuit arrangement for preventing locking of a wheel of a vehicle during braking by means of an anti-lock control device, said electrical circuit arrangement comprising:

means for causing said anti-lock control device to reduce hydraulic braking pressure, exerted on the brake of the wheel, according to operation of the brake when a vehicle speed signal generated by a vehicle speed sensor indicates that the vehicle speed exceeds a predetermined vehicle speed and a wheel locking signal generated by a wheel locking sensor indicates that the wheel tends to lock;

means for rendering said anti-lock control device inoperable and for permitting the hydraulic braking pressure to increase again in accordance with the operation of the brake when the vehicle speed signal indicates that the vehicle speed drops below the predetermined vehicle speed; and a first timer which from a moment at which the vehicle speed, indicated by the vehicle speed signal drops below the predetermined vehicle speed during braking, fixes a first time period during which the hydraulic braking pressure is step-wise increase in accordance with the operation of the brake.

8. The electrical circuit arrangement of claim 7, wherein said hydraulic pressure intermittently increases during said first time period.

9. The electrical circuit of claim 7, further comprising a second timer which from a moment at which a wheel slip signal produced by a wheel slip sensor indicates that a slip of the wheel drops below a predetermined slip, fixes a second time period during which the hydraulic braking pressure is gradually increased according to the operation of the brake.

10. The electrical circuit arrangement of claim 9, wherein the hydraulic braking pressure intermittently increases during said second time period.

11. The electrical circuit arrangement of claim 9, further comprising a means for making said wheel slip signal ineffective at a point when the vehicle speed signal indicates that the vehicle speed drops below the predetermined vehicle speed, the second timer being reset after the first time period elapses.

12. The electrical circuit arrangement of claim 10 further comprising a means for making said wheel slip signal ineffective at a point when the vehicle speed signal indicates that the vehicle speed drops below the predetermined vehicle speed, the second timer being reset after the first time period elapses.

13. The electrical circuit arrangement of claim 9, further comprising a means for step-wise increasing the hydraulic braking pressure during the second time period when a wheel acceleration signal generated by a wheel acceleration sensor indicates than an acceleration of the wheel exceeds a predetermined acceleration.

14. The electrical circuit arrangement of claim 10, further comprising a means for step-wise increasing the hydraulic braking pressure during the second time period when a wheel acceleration signal generated by a wheel acceleration sensor indicates that an acceleration of the wheel exceeds a predetermined acceleration.

15. The electrical circuit arrangement of claim 11, further comprising a means for step-wise increasing the hydraulic braking pressure during the second time period when a wheel acceleration signal generated by a wheel acceleration sensor indicates that an acceleration of the wheel exceeds a predetermined acceleration.

16. The electrical circuit arrangement of claim 13, wherein the hydraulic braking pressure intermittently increases during the second time period.

17. The electrical circuit arrangement of claim 13, further comprising a means for making the wheel acceleration signal ineffective at a point when the vehicle speed signal indicates that the vehicle speeds drops below the predetermined vehicle speeds, the second timer being reset after the first time period has elapsed.

18. The electrical circuit arrangement of claim 14, further comprising a means for making the wheel acceleration signal ineffective at a point when the vehicle speed signal indicates that the vehicle speeds drops below the predetermined vehicle speed, the second timer being reset after the first time period has elapsed.

19. The electrical circuit arrangement of claim 15, further comprising a means for making the wheel acceleration signal ineffective at a point when the vehicle speed signal indicates that the vehicle speeds drops below the predetermined vehicle speed, the second timer being reset after the first time period has elapsed.

20. The electrical circuit arrangement of claim 16, further comprising a means for making the wheel acceleration signal ineffective at a point when the vehicle speed signal indicates that the vehicle speeds drops below the predetermined vehicle speed, the second timer being reset after the first time period has elapsed.

* * * * *